US012645219B2

(12) United States Patent
Yonetani et al.

(10) Patent No.: US 12,645,219 B2
(45) Date of Patent: Jun. 2, 2026

(54) AGENT CONTROL DEVICE, LEARNING DEVICE, AND COMPUTER-READABLE RECORDING MEDIUM

(71) Applicant: OMRON Corporation, Kyoto (JP)

(72) Inventors: Ryo Yonetani, Tokyo (JP); Mai Nishimura Kurose, Tokyo (JP); Hikaru Asano, Tokyo (JP)

(73) Assignee: OMRON Corporation, Kyoto (JP)

( * ) Notice: Subject to any disclaimer, the term of this patent is extended or adjusted under 35 U.S.C. 154(b) by 69 days.

(21) Appl. No.: 18/241,146

(22) Filed: Aug. 31, 2023

(65) Prior Publication Data

US 2024/0094731 A1　　Mar. 21, 2024

(30) Foreign Application Priority Data

Sep. 20, 2022　(JP) ................................. 2022-149607

(51) Int. Cl.
　　 G05D 1/00　　　　　(2006.01)
(52) U.S. Cl.
　　 CPC ......... G05D 1/0214 (2013.01); G05D 1/0217 (2013.01); G05D 1/0221 (2013.01); G05D 1/0289 (2013.01)
(58) Field of Classification Search
　　 CPC .. G05D 1/0214; G05D 1/0217; G05D 1/0221; G05D 1/0289
　　 See application file for complete search history.

(56) References Cited

U.S. PATENT DOCUMENTS

2019/0317510 A1* 10/2019 Ros Sanchez ......... G06N 3/084
2020/0181879 A1*  6/2020 Halder .................. E02F 9/2054
(Continued)

FOREIGN PATENT DOCUMENTS

CN　　　　115083174 A　　9/2022
EP　　　　　 382420 B1 *　6/1996 ............. B29C 35/08
(Continued)

OTHER PUBLICATIONS

Sartoretti et al., "PRIMAL: Pathfinding via Reinforcement and Imitation Multi-Agent Learning," IEEE Robotics and Automation Letters, IEEE, 4(3): 2378-2385 (2019) XP011715894, DOI: 10.1109/LRA.2019.2903261.

(Continued)

*Primary Examiner* — Adnan M Mirza
(74) *Attorney, Agent, or Firm* — Morgan, Lewis & Bockius LLP

(57)　　　　　ABSTRACT

An agent control device includes a movement determination unit configured to input a first observation set, obtained by observing a state of a control target agent, and to input a second observation set, obtained by observing a state of at least one other agent in a periphery of the control target agent, to a first model and to determine information regarding movement of the control target agent in accordance with an output of the first model, a change amount determination unit configured to input the first observation set and the second observation set to a second model and to determine a change amount with respect to the information regarding movement of the control target agent, and an operation control unit configured to operate the control target agent by applying the change amount determined by the change amount determination unit to the information regarding movement determined by the movement determination unit.

17 Claims, 14 Drawing Sheets

(56)                 References Cited

U.S. PATENT DOCUMENTS

2022/0309410 A1      9/2022   Nakadai
2023/0385892 A1     11/2023   Higa

FOREIGN PATENT DOCUMENTS

EP            3832420  A1  *  6/2021   .......... B60W 30/095
JP        2019-007832  A      1/2019
JP        2019-125345  A      7/2019
JP        2022-526546  A      5/2022
WO        2022/085171  A1     4/2022

OTHER PUBLICATIONS

Ma et al., "Multi-Agent Path Finding with Deadlines," Proceedings of the Twenty-Seventh International Joint Conference on Artificial Intelligence, pp. 417-423 (2018) XP093125213, California, DOI: 10.24963/ijcai.2018/58, ISBN: 978-0-9992411-2-7.
Extended European Search Report dated Feb. 13, 2024, issued in corresponding European Patent Application No. 23195273.0.
Silver, "Cooperative Pathfinding," AAAI Conference on Artificial Intelligence and Interactive Digital Entertainment, 1: 117-122 (2005).
Sharon et al., "Conflict-based search for optimal multi-agent path-finding," Artificial Intelligence, 219: 40-66 (2015).
Office Action issued in corresponding Japanese Patent Application No. 2022-149607, dated Mar. 17, 2026.

\* cited by examiner

AGENT CONTROL DEVICE, LEARNING DEVICE, AND COMPUTER-READABLE RECORDING MEDIUM

CROSS-REFERENCE TO RELATED APPLICATION

This application is based on and claims priority under 35 USC 119 from Japanese Patent Application No. 2022-149607, filed on Sep. 20, 2022, the disclosure of which is incorporated by reference herein.

BACKGROUND

Technical Field

The present disclosure relates to an agent control device, a learning device, an agent control method, a learning method, and a computer-readable recording medium.

Related Art

A multi-agent navigation technology has been disclosed in which, in an environment where a plurality of agents such as a mobile robot, an automated vehicle, and a drone that automatically travel is present, each agent can reach a destination (goal) without colliding with the others (refer to Silver, D. 2005. Cooperative pathfinding. In AAAI Conference on Artificial Intelligence and Interactive Digital Entertainment, volume 1, 117-122, Sharon, G.; Stern, R.; Felner, A.; and Sturtevant, N. R. 2015. Conflict-based search for optimal multi-agent pathfinding. Artificial Intelligence, 219: 40-66). Silver, D. 2005. Cooperative pathfinding. In AAAI Conference on Artificial Intelligence and Interactive Digital Entertainment, volume 1, 117-122 and Sharon, G. In Comparative Pathfinding; Stern, R.; Felner, A.; and Sturtevant, N. R. 2015. Conflict-based search for optimal multi-agent pathfinding. Artificial Intelligence, 219: 40-66 disclose a technology for minimizing the sum of route lengths (required times) of all agents or the route length (required time) of an agent that has reached a goal latest.

In a case in which there is a difference in routes, operations, and the like among a plurality of agents, if the sum of route lengths (required times) of all the agents or the route length (required time) of an agent that has reached a goal latest is minimized, there is a possibility that a specific agent will reach a destination with an extreme delay. The former method minimizes the overall route lengths and required times by using the route length and the required time of each agent, and the latter minimizes the route length and the required time by increasing the priority of a specific agent and decreasing the priorities of other agents.

For these reasons, in navigation of a plurality of agents having differences in a departure place, a destination, a route, and the like, reducing variations in a route length and a required time of each agent is not being studied because it interferes with the above-described minimization.

SUMMARY

According to one aspect of the present disclosure, there is provided an agent control device including: a movement determination unit configured to input a first observation set, obtained by observing a state of a control target agent, and to input a second observation set, obtained by observing a state of at least one other agent in a periphery of the control target agent, to a first model and to determine information regarding movement of the control target agent in accordance with an output of the first model; a change amount determination unit configured to input the first observation set and the second observation set to a second model and to determine a change amount with respect to the information regarding movement of the control target agent in accordance with an output of the second model; and an operation control unit configured to operate the control target agent by applying the change amount determined by the change amount determination unit to the information regarding movement determined by the movement determination unit.

BRIEF DESCRIPTION OF THE DRAWINGS

Exemplary embodiments of the present disclosure will be described in detail based on the following figures, wherein.

DETAILED DESCRIPTION

First, the background in which the present discloser has conceived embodiments of the present disclosure will be described. As described above, there is a multi-agent navigation technology that allows each of agents to reach a destination without colliding with each other in an environment in which a plurality of agents such as a mobile robot, an automated vehicle, and a drone that can automatically travel is present.

However, in a case in which the sum of the route lengths (required times) of all agents or the route length (required time) of an agent that has reached a goal latest is minimized, there is a possibility that a specific agent reaches a destination with an extreme delay. Each agent often has to take a detour route to avoid other agents or wait until the other agents pass, resulting in a delay in arrival time as compared to a case in which each agent completely ignores the other agents and passes through a selfish route.

Figure 1:
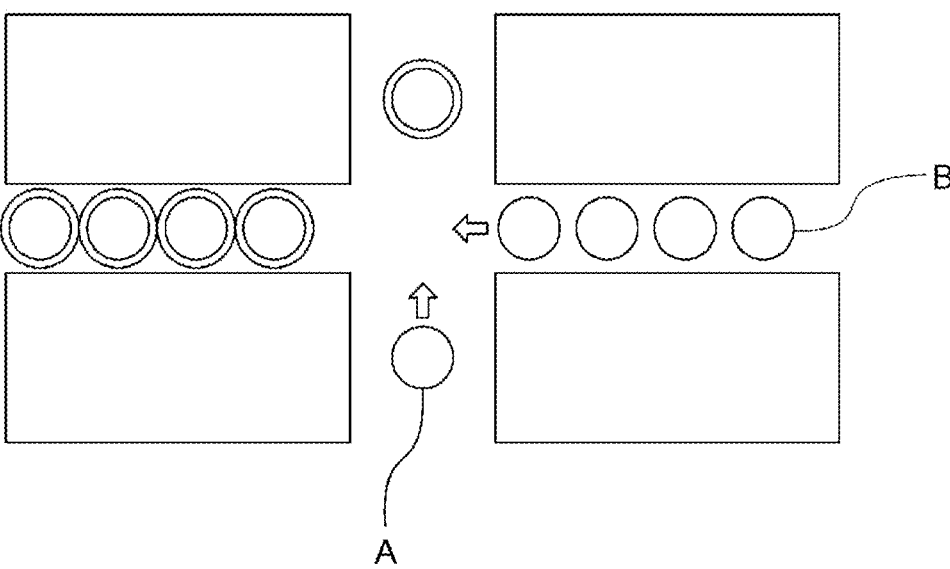
FIG. 1 is a diagram showing an example in which each of a plurality of agents moves to a target place.

FIG. 1 is a diagram showing an example in which each of a plurality of agents moves to a target place. Each of agents A and B is represented as a double circle after going straight through an intersection and moving to a target place with a starting point as a single circle. For example, a case in which there are two types of agents A (one) and B (four) moving near the intersection as shown in FIG. 1 is conceived. Here, a case in which the group of agents B all go straight and pass through the intersection and then the agent A goes straight and passes through the intersection (pattern 1) is compared with a case in which the group of agents B all goes straight and passes through the intersection after the agent A goes straight and passes through the intersection (pattern 2). The agent A of pattern 1 needs to wait for the four agents B to pass at the intersection. The agent A of pattern 2 passes without waiting for the agent B, and the agents B can move after a waiting time for one agent. Comparing patterns 1 and 2, it can be ascertained that pattern 2 is more efficient. As described above, in a case in which the efficiency changes depending on the manner in which agents move, and the number of agents increases and thus a crossing situation becomes complicated, evaluation can be performed by variation in delay, and if the variation is small, it can be evaluated that the efficiency is high. "Variation" means statistical variation and may include variance or standard deviation.

In view of the above points, the present discloser has intensively studied a technology for realizing navigation with less variation in delay such that delay of arrival is not biased to a specific agent and all agents are delayed to the same extent. As a result, as described below, the present discloser has devised a technology for realizing navigation with less variation in delay in which all agents are delayed to the same extent.

Hereinafter, an example of an embodiment of the present disclosure will be described with reference to the drawings. In the drawings, the same or equivalent components and parts are denoted by the same reference numerals. In addition, dimensional ratios in the drawings are exaggerated for convenience of description, and may be different from actual ratios.

Figure 2:
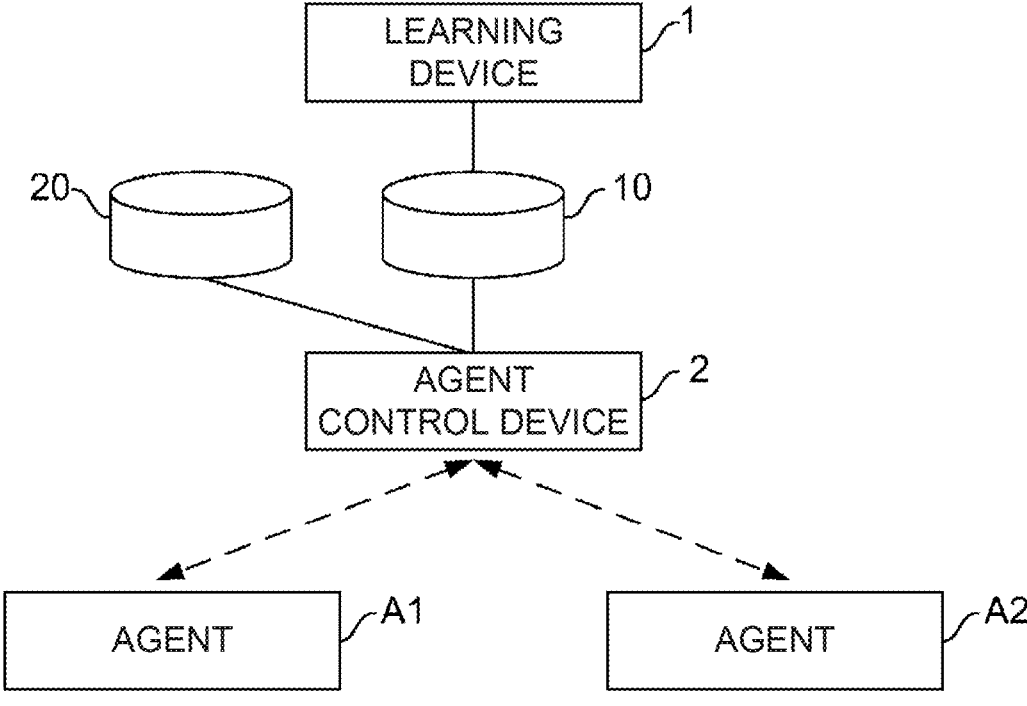
FIG. 2 is a diagram showing a schematic configuration of an agent navigation system according to an embodiment of the disclosed technology.

FIG. 2 is a diagram showing a schematic configuration of an agent navigation system according to the present embodiment. The agent navigation system shown in FIG. 2 includes a learning device 1 and an agent control device 2.

The learning device 1 is a device that performs machine learning of a cooperation model 10 used by the agent control device 2 for controlling operations of agents A1 and A2. The agent control device 2 is a device that controls the operations of the agents A1 and A2 using the cooperation model 10. In the case of controlling the operations of the agents A1 and A2, the agent control device 2 uses the output of a movement model 20 and uses the output of the cooperation model 10 for changing the output of the movement model 20. The movement model 20 is a model that determines a next movement direction or a next movement amount on the basis of information on an obstacle in an environment where the agents A1 and A2 are present, destinations of the agents A1 and A2, and surrounding agents. The movement model 20 may use a classical algorithm, for example, a dynamic window approach, and may be a neural network trained by machine learning, or the like.

Then, the cooperation model 10 is a machine-learned model for changing the output of the movement model 20. The cooperation model 10 may be a neural network machine-learned through a predetermined method.

The agents A1 and A2 are examples of a control target agent of the present disclosure, and examples of such a control target agent include a mobile robot that automatically travels, an autonomous mobile robot (AMR), an automated guided vehicle (AGV), and an automated vehicle. Furthermore, the cooperation model 10 is an example of a second model of the present disclosure, and is used in a case in which the agent control device 2 controls the operations of the agents A1 and A2.

In the case of learning the cooperation model 10, the learning device 1 uses a first observation set obtained by observing a state of a certain agent (for example, the agent A1) and a second observation set obtained by observing a state of at least one other agent (for example, the agent A2) around the agent A1. Each observation set includes information observed by each agent, such as the location of each agent, a relative position of a goal as viewed from the location of each agent, a disposition state of surrounding objects, and a current time delay compared with a required time in a case in which each agent reaches the goal while ignoring other agents. Therefore, the agents A1 and A2 may include sensors for observing surrounding situations.

The observation timing and the observation interval of each observation set are not limited to a specific pattern, and for example, observation of an observation set may be performed in response to an operation interval of an agent.

Then, the learning device 1 performs machine learning of the cooperation model 10 such that variation in delay among a plurality of agents that reach the goal of each agent is reduced. In addition, the learning device 1 may perform machine learning of the cooperation model 10 such that a delay in which the agents reach goals is kept small. That is, the learning device 1 performs machine learning of the cooperation model 10 such that variation in delay between the agents A1 and A2 is reduced or traveling times are reduced.

Although the learning device 1 and the agent control device 2 are separate devices in the present embodiment, the present disclosure is not limited to such an example, and the learning device 1 and the agent control device 2 may be the same device. Although the cooperation model 10 is present independently of the learning device 1 and the agent control device 2 in the present embodiment, the present disclosure is not limited to such an example, and for example, the cooperation model 10 may be held in the learning device 1 or the agent control device 2. Further, the number of agents may be plural.

Next, a configuration example of the learning device 1 will be described.

Figure 3:
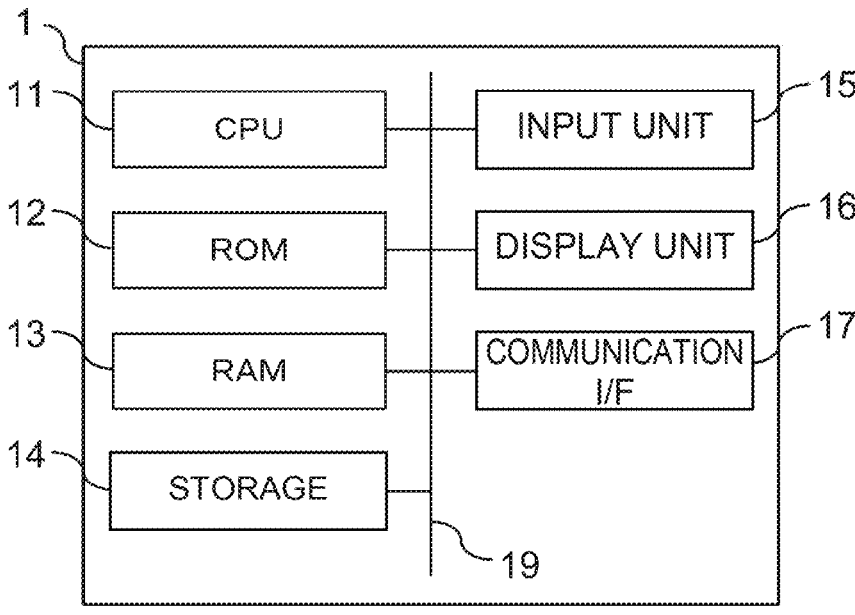
FIG. 3 is a block diagram showing an example of a hardware configuration of a learning device.

FIG. 3 is a block diagram showing an example of a hardware configuration of the learning device 1.

As shown in FIG. 3, the learning device 1 includes a central processing unit (CPU) 11, a read only memory (ROM) 12, a random access memory (RAM) 13, a storage 14, an input unit 15, a display unit 16, and a communication interface (I/F) 17. The respective components are connected to each other via a bus 19 such that the components can communicate.

The CPU 11 is a central processing unit, executes various programs, and controls each unit. That is, the CPU 11 reads a program from the ROM 12 or the storage 14 and executes the program using the RAM 13 as a work area. The CPU 11 performs control of each of the above-described components and various types of calculation processing according to a program recorded in the ROM 12 or the storage 14. In the present embodiment, a learning program for learning the cooperation model 10 is stored in the ROM 12 or the storage 14.

The ROM 12 stores various programs and various types of data. The RAM 13 temporarily stores a program or data as a work area. The storage 14 includes a storage device such as a hard disk drive (HDD), a solid state drive (SSD), or a flash memory and stores various programs including an operating system and various types of data.

The input unit 15 includes a pointing device such as a mouse and a keyboard, and is used to perform various inputs.

The display unit 16 is, for example, a liquid crystal display, and displays various types of information. The display unit 16 may serve as the input unit 15 by adopting a touch panel system.

The communication interface 17 is an interface for communicating with other devices, and uses, for example, standards such as Ethernet (registered trademark), FDDI, and Wi-Fi (registered trademark).

In the case of executing the aforementioned learning program, the learning device 1 realizes various functions using the aforementioned hardware resources. A functional configuration realized by the learning device 1 will be described.

Figure 4:
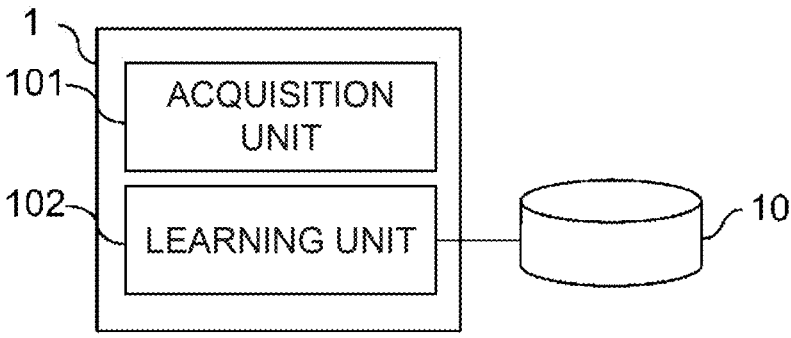
FIG. 4 is a block diagram showing an example of a functional configuration of the learning device.

FIG. 4 is a block diagram showing an example of a functional configuration of the learning device 1.

As shown in FIG. 4, the learning device 1 includes an acquisition unit 101 and a learning unit 102 as functional components. Each functional component is realized by the CPU 11 reading and executing the learning program stored in the ROM 12 or the storage 14.

The acquisition unit 101 acquires the first observation set obtained by observing a state of a certain agent (for example, agent A1) and the second observation set obtained by observing a state of at least one other agent (for example, agent A2) around the agent A1, used for learning of the cooperation model 10. The number of agents that generate the second observation set is not limited to one.

The learning unit 102 performs machine learning of the cooperation model 10 using the first observation set and the second observation set acquired by the acquisition unit 101. The learning unit 102 performs machine learning of the cooperation model 10 such that variation in delay among a plurality of agents that reach a goal of each agent is reduced. In addition, the learning unit 102 may perform machine learning of the cooperation model 10 such that a delay in which the agents reach goals is kept small. Costs required for movement can include, for example, a time required for movement from a start to a goal, a moving distance, the amount of energy consumed during movement, and the like.

That is, the learning unit 102 may train the cooperation model 10 such that variations in delays from scheduled moving times of a control target agent and another agent are reduced in accordance with an output from the cooperation model 10. Furthermore, the learning unit 102 may train the cooperation model 10 such that variations in extension from scheduled moving distances of the control target agent and another agent are reduced in accordance with the output from the cooperation model 10. In addition, the learning unit 102 may train the cooperation model 10 such that variations in increase from scheduled use energies of the control target agent and another agent are reduced in accordance with the output from the cooperation model 10. In addition, the learning unit 102 may perform machine learning of the cooperation model 10 such that at least one of a delay in which an agent reaches a goal, an extension from a scheduled moving distance, or an increase from a scheduled use energy is kept small.

Specifically, the learning unit 102 performs machine learning of the cooperation model 10 such that variations in delay among a plurality of agents are reduced. In addition, the learning unit 102 may perform machine learning of the cooperation model 10 such that a delay in which the agents reach goals is kept small. In the present embodiment, the learning unit 102 performs machine learning of the cooperation model 10 by performing reinforcement learning of the cooperation model 10.

An example of machine learning of the cooperation model 10 by the learning unit 102 will be described. In a case in which an agent has reached a goal, a reward representing how much a behavior of the agent changed by the cooperation model 10 has contributed to improvement of a time delay of another agents is given. Examples of such a reward include an improvement range of the amount of time delay, an improvement range of a goal traveling time, an improvement range of a Q value in a case in which the movement model 20 has been acquired by reinforcement learning, and the like. The Q value in a case in which the movement model 20 has been acquired by reinforcement learning is a value determined on the basis of factors such as how quickly an agent has reached a goal and whether the agent has not collided with an obstacle. Of course, the reward is not limited to such an example, and may be arbitrarily determined by a user. The learning unit 102 performs reinforcement learning of the cooperation model 10 such that the reward as described above is maximized.

Next, a configuration example of the agent control device 2 will be described.

Figure 5:
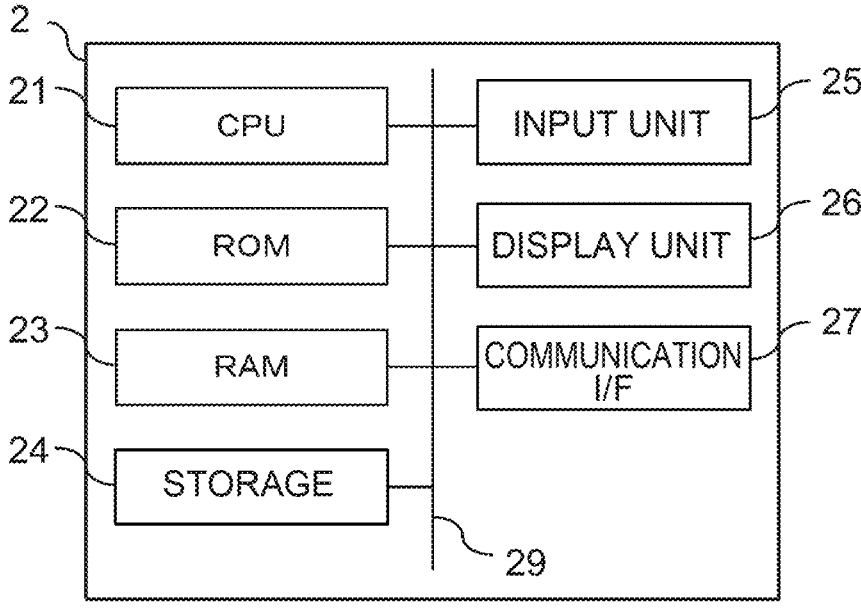
FIG. 5 is a block diagram showing an example of a hardware configuration of an agent control device.

FIG. 5 is a block diagram showing an example of a hardware configuration of the agent control device 2.

As shown in FIG. 5, the agent control device 2 includes a CPU 21, a ROM 22, a RAM 23, a storage 24, an input unit 25, a display unit 26, and a communication interface (I/F) 27. The respective components are connected to each other via a bus 29 such that the components can communicate.

The CPU 21 is a central processing unit, executes various programs, and controls each unit. That is, the CPU 21 reads a program from the ROM 22 or the storage 24 and executes the program using the RAM 23 as a work area. The CPU 21 performs control of each of the above-described components and various types of calculation processing according to a program recorded in the ROM 22 or the storage 24. In the present embodiment, the ROM 22 or the storage 24 stores an agent control program for controlling the operation of an agent using outputs of the cooperation model 10 and the movement model.

The ROM 22 stores various programs and various types of data. The RAM 23 temporarily stores a program or data as a work area. The storage 24 includes a storage device such as an HDD, an SSD, or a flash memory and stores various programs including an operating system and various types of data.

The input unit 25 includes a pointing device such as a mouse and a keyboard, and is used to perform various inputs.

The display unit 26 is, for example, a liquid crystal display, and displays various types of information. The display unit 26 may serve as the input unit 25 by adopting a touch panel system.

The communication interface 27 is an interface for communicating with other devices, and uses, for example, standards such as Ethernet (registered trademark), FDDI, and Wi-Fi (registered trademark).

In the case of executing the aforementioned learning program, the agent control device 2 realizes various functions using the aforementioned hardware resources. A functional configuration realized by the agent control device 2 will be described.

Figure 6:
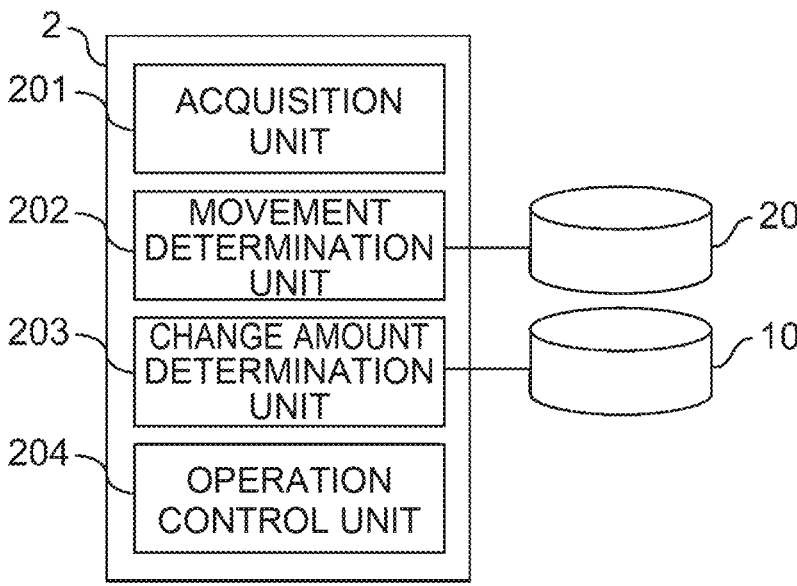
FIG. 6 is a block diagram showing an example of a functional configuration of the agent control device.

FIG. 6 is a block diagram showing an example of a functional configuration of the agent control device 2.

As shown in FIG. 6, the agent control device 2 includes an acquisition unit 201, a movement determination unit 202, a change amount determination unit 203, and an operation control unit 204 as functional components. Each functional component is realized by the CPU 21 reading and executing the agent control program stored in the ROM 22 or the storage 24.

The acquisition unit 201 acquires a first observation set obtained by observing a state of a certain agent (for example, agent A1) and a second observation set obtained by observing a state of at least one other agent (for example, agent A2) around the agent A1, used to control operations of agents A1 and A2. The number of agents that generate the second observation set is not limited to one.

The movement determination unit 202 inputs the first observation set and the second observation set acquired by the acquisition unit 201 to the movement model 20, and determines information regarding movement of a control target agent using the output from the movement model 20. Here, the information regarding movement of the control target agent may include a movement direction, a movement amount, a time required for movement, a rotation direction, a rotation amount, and the like of the agent. For example, the movement determination unit 202 determine that the information regarding movement of the control target agent is proceeding 1 meter in the west direction using the output from the movement model 20.

The change amount determination unit 203 inputs the first observation set and the second observation set to the cooperation model 10, and determines a change amount with respect to the information regarding movement of the control target agent using the output from the cooperation model 10. More specifically, the change amount determination unit 203 determines the change amount such that variation in costs required for movement of the control target agent and another agent is reduced. In addition, the change amount determination unit 203 may determine the change amount such that both variation and the average in costs required are reduced. Costs required for movement can include, for example, a time required for movement from a start to a goal, a moving distance, the amount of energy consumed during movement, and the like. "Cost" indicates an example of "compensation" of the present disclosure. Then, the output of the cooperation model 10 may include information for determining whether or not to bear costs.

That is, the change amount determination unit 203 may determine the change amount such that variations in delay from scheduled moving times of the control target agent and another agent are reduced in accordance with the output from the cooperation model 10. In addition, the change amount determination unit 203 may determine the change amount such that variations in extension from scheduled moving distance of the control target agent and another agent are reduced in accordance with the output from the cooperation model 10. In addition, the change amount determination unit 203 may determine the change amount such that variations in increases from scheduled use energies of the control target agent and another agent are reduced in accordance with the output from the cooperation model 10. Furthermore, the change amount determination unit 203 may determine the change amount such that variations and the average in delays from the scheduled moving times of the control target agent and another agent are reduced in accordance with the output from the cooperation model 10. In addition, the change amount determination unit 203 may determine the change amount such that variations and the average in extension from scheduled moving distances of the control target agent and another agent are reduced in accordance with the output from the cooperation model 10. In addition, the change amount determination unit 203 may determine the change amount such that variations and the average in increases from scheduled use energies of the control target agent and another agent are reduced in accordance with the output from the cooperation model 10.

Although the change amount determination unit 203 can arbitrarily select an increasing cost, the user may designate which cost is to be prioritized, or the cost to be prioritized may be designated for each agent.

The change amount determined by the change amount determination unit 203 may be any of 0/1 that determines whether or not to move the control target agent, or may be a weight applied to a movement amount that is a value between 0 and 1.

The operation control unit 204 controls the operation of the control target agent by applying the change amount determined by the change amount determination unit 203 to the information regarding movement of the control target agent determined by the movement determination unit 202.

For example, if the change amount determined by the change amount determination unit 203 is 0, the operation control unit 204 performs control to stop the control target agent. Furthermore, for example, if the information regarding movement of the control target agent determined by the movement determination unit 202 is proceeding 1 meter in the west direction and the change amount determined by the change amount determination unit 203 is 0.5, the operation control unit 204 controls the control target agent such that the control target agent proceeds 0.5 meters in the west direction. Furthermore, for example, if the information regarding movement of the control target agent determined by the movement determination unit 202 is proceeding 10 meters in the west direction in one second and the change amount determined by the change amount determination unit 203 is 0.1, the operation control unit 204 controls the control target agent such that the control target agent proceeds 10 meters in the west direction in 10 seconds.

In the case of controlling the operation of the control target agent, the operation control unit 204 may determine whether or not the control target agent bears compensation required for movement in accordance with the output of the cooperation model 10 in a case in which only the first observation set has been input to the cooperation model 10.

With such a configuration, the agent control device 2 can control movement of agents to avoid a situation in which a specific agent is extremely delayed in an environment in which a plurality of agents is present.

Next, the operation of the learning device 1 will be described.

Figure 7:
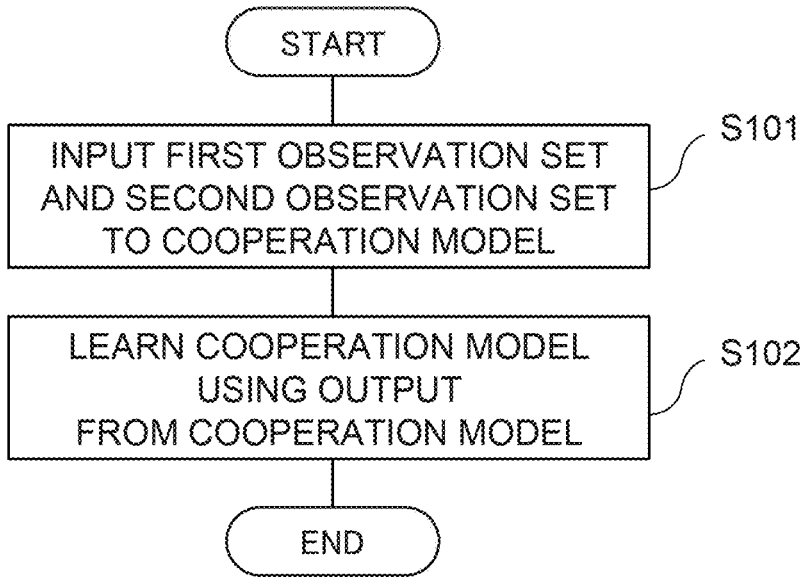
FIG. 7 is a flowchart showing a flow of learning processing by the learning device.

FIG. 7 is a flowchart showing a flow of learning processing by the learning device 1. The CPU 11 reads the learning program from the ROM 12 or the storage 14, develops the learning program in the RAM 13, and executes the learning program, whereby learning processing is performed.

In step S101, the CPU 11 inputs the first observation set and the second observation set acquired for training of the cooperation model 10 to the cooperation model 10.

Subsequently to step S101, the CPU 11 performs reinforcement learning of the cooperation model 10 using the output from the cooperation model 10 in step S102. Since the example of the learning processing of the cooperation model 10 has been described in processing of the learning unit 102 described above, details are omitted, but the CPU 11 performs reinforcement learning of the cooperation model 10 such that an obtained reward is maximized.

Next, the operation of the agent control device 2 will be described.

Figure 8:
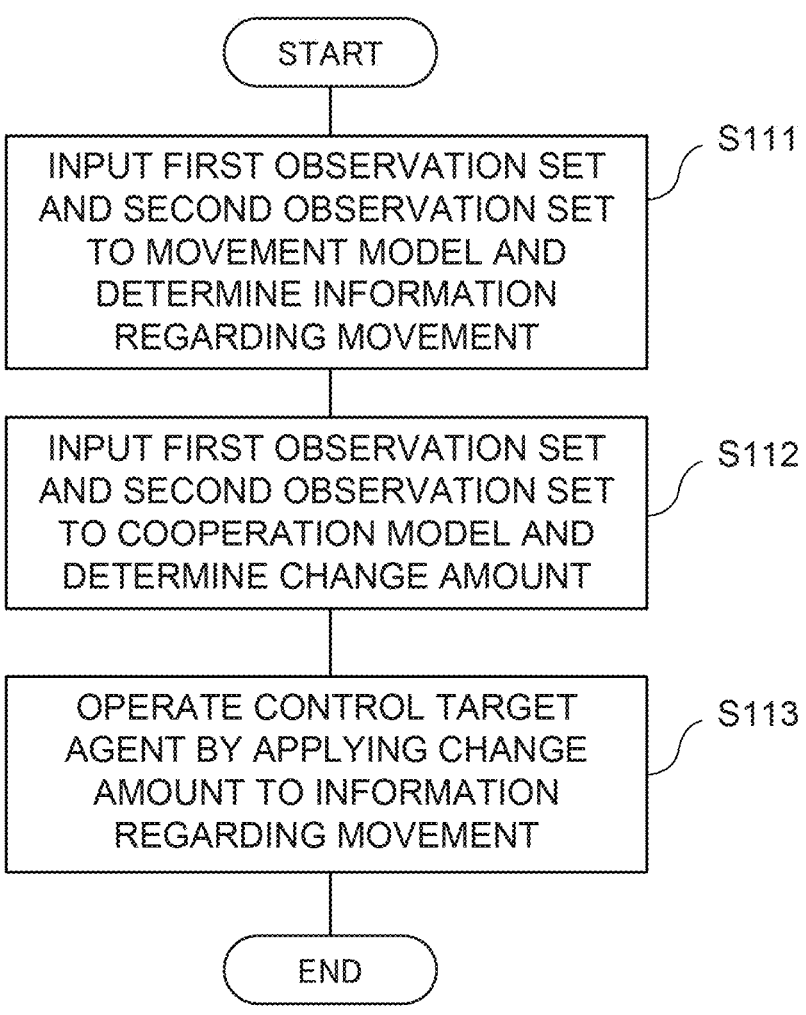
FIG. 8 is a flowchart showing a flow of agent control processing by the agent control device.

FIG. 8 is a flowchart illustrating a flow of agent control processing by the agent control device 2. The CPU 21 reads the agent control program from the ROM 22 or the storage 24, develops the agent control program in the RAM 23, and executes the agent control program, whereby agent control processing is performed.

In step S111, the CPU 21 acquires the first observation set and the second observation set from each agent, inputs the acquired first observation set and second observation set to the movement model 20, and determines information regarding movement of a control target agent using the output from the movement model 20.

Subsequently to step S111, the CPU 21 inputs the acquired first observation set and second observation set to the cooperation model 10 and determines a change amount with respect to the information regarding movement of the control target agent using the output from the cooperation model 10 in step S112.

Subsequently to step S112, in step S113, the CPU 21 controls movement of the control target agent by applying the change amount determined in step S112 to the information regarding movement of the control target agent determined in step S111.

Next, a specific example of control of movement of an agent by the agent control device 2 will be described.

FIGS. 9 to 14 are diagrams illustrating specific examples of control of movement of an agent by the agent control device 2. FIGS. 9 to 14 illustrate examples of control of movement of the agents A1 and A2 moving near an intersection. Reference sign G1 in FIGS. 9 to 14 represents a destination point of the agent A1, and reference sign G2 represents a destination point of the agent A2. Although only two agents A1 and A2 are illustrated in order to simplify the description in FIGS. 9 to 14, even in a case in which three or more agents are present, movement of the agents can be similarly controlled.

Figure 9:
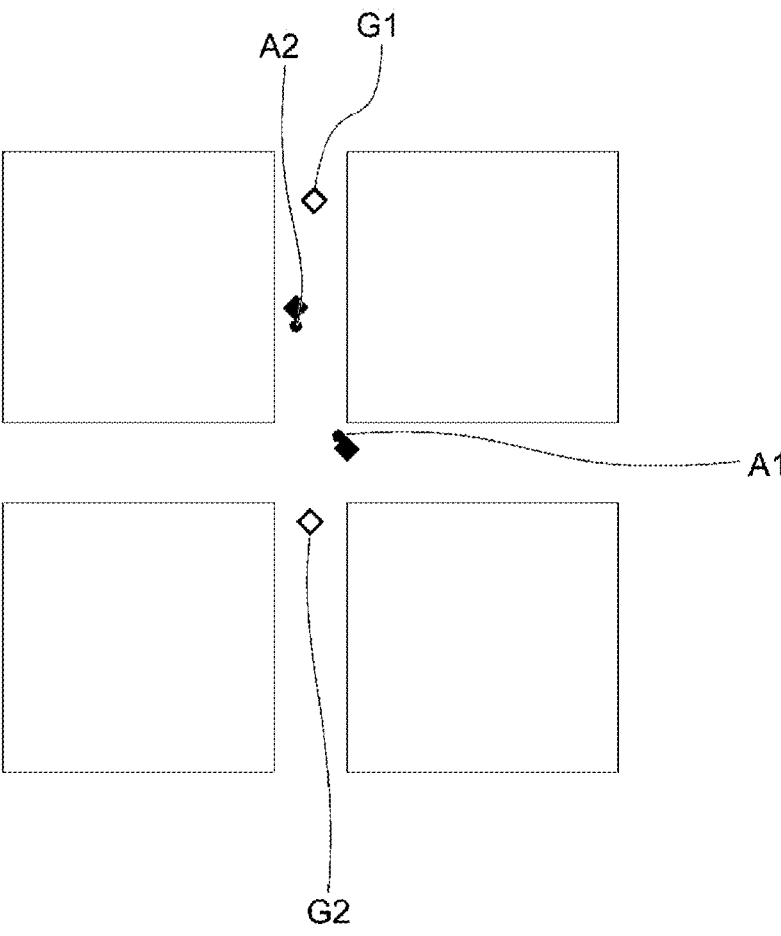
FIG. 9 is a diagram illustrating a specific example of control of movement of an agent by the agent control device.
Figure 10:
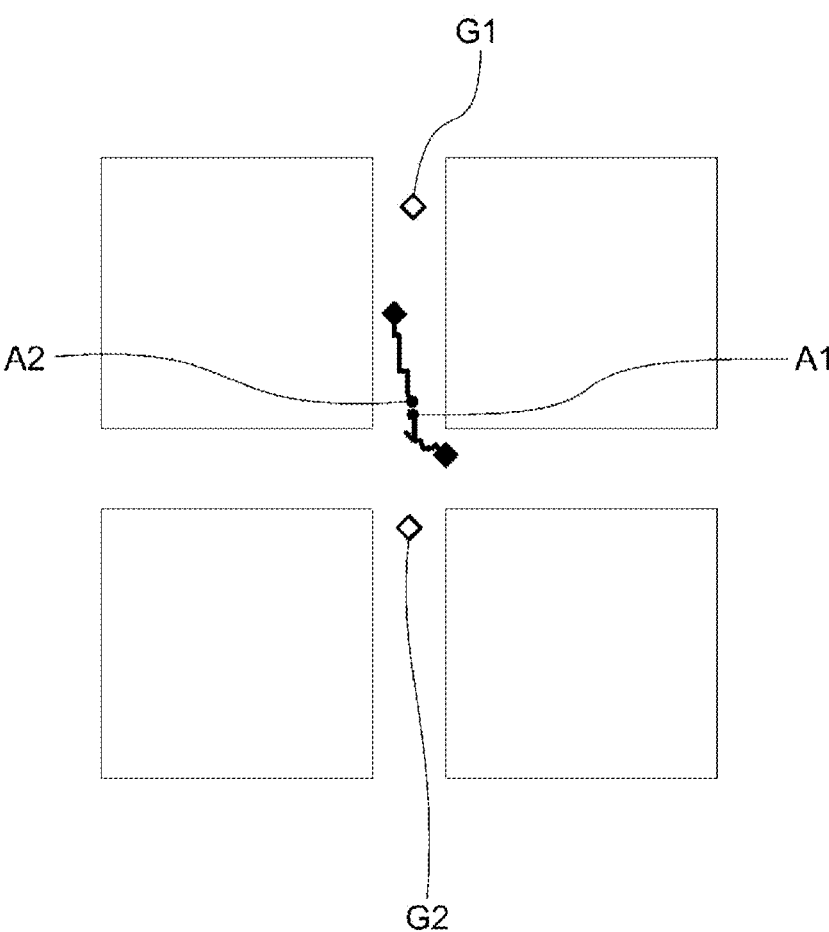
FIG. 10 is a diagram illustrating a specific example of control of movement of an agent by the agent control device.

For example, as illustrated in FIG. 9, if the agents A1 and A2 are present in the vicinity of an intersection and the agents A1 and A2 move as they are toward the destination points G1 and G2, respectively, there is a possibility that the agents A1 and A2 collide with each other. FIG. 10 illustrates a state in which the agents A1 and A2 approach each other. Therefore, the agent control device 2 needs to control the operations of the agents A1 and A2 such that a collision between the agents A1 and A2 is avoided.

Here, the agent control device 2 controls the operations of the agents A1 and A2 by applying the output of the cooperation model 10 to the output of the movement model 20 such that the agents A1 and A2 reach the destination points G1 and G2 with less variation in delay or with less variation and average in delay. For example, in a case in which the agent A1 can reach the destination point G1 as scheduled, but the agent A2 is delayed in reaching the destination point G2 if the agent A2 is caused to stand by on the spot and the agent A1 is caused to pass first, whereas both the agents A1 and A2 are delayed in reaching the destination points if the agent A1 is caused to stand by on the spot and the agent A2 is caused to pass first, the agent control device 2 controls the operations of the agents A1 and A2 such that the agent A1 is caused to stand by on the spot and the agent A2 is caused to pass first.

Figure 11:
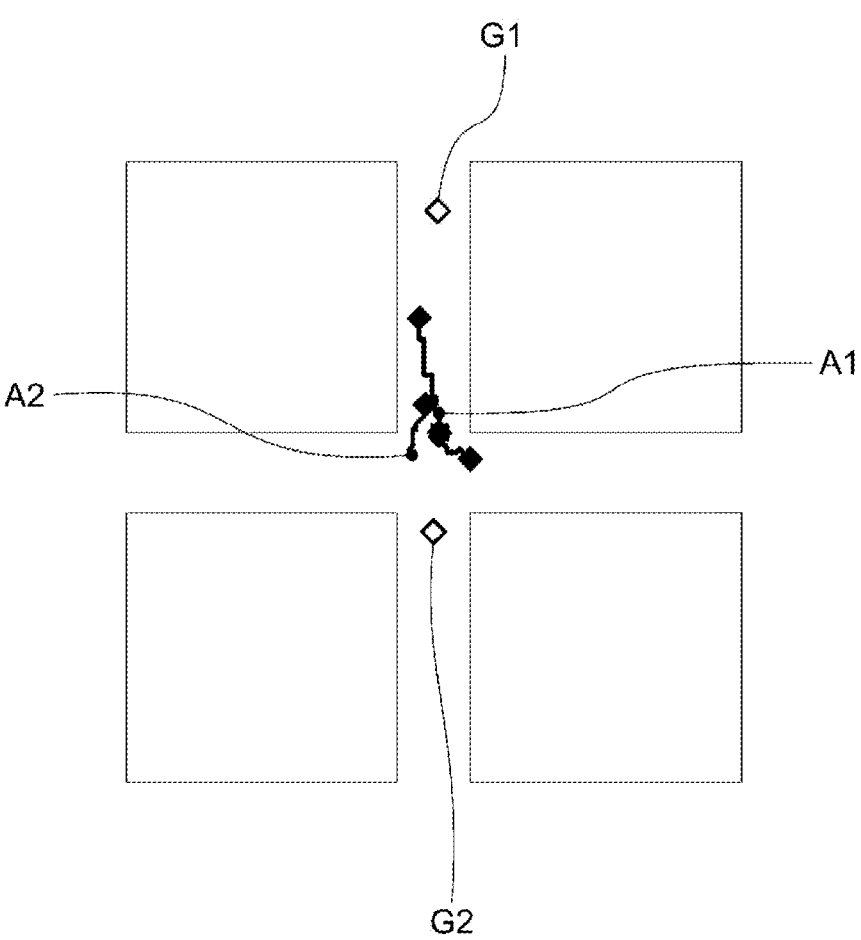
FIG. 11 is a diagram illustrating a specific example of control of movement of an agent by the agent control device.

FIG. 11 illustrates a state in which the agent A1 stands by on the spot and the agent A2 moves toward the destination point G2 such that the agent A2 avoids the agent A1 under the control of the agent control device 2.

Figure 12:
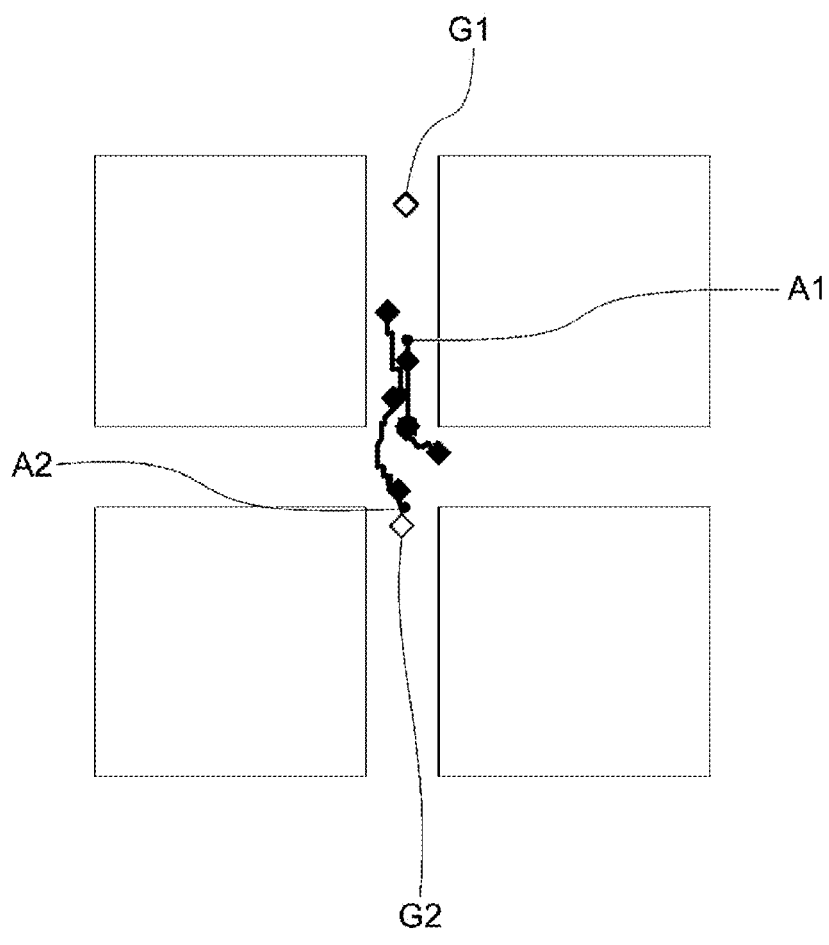
FIG. 12 is a diagram illustrating a specific example of control of movement of an agent by the agent control device.

FIG. 12 illustrates a state in which the agent A1 starts to move and moves toward the destination point G1 after the agent A2 passes under the control of the agent control device 2.

Figure 13:
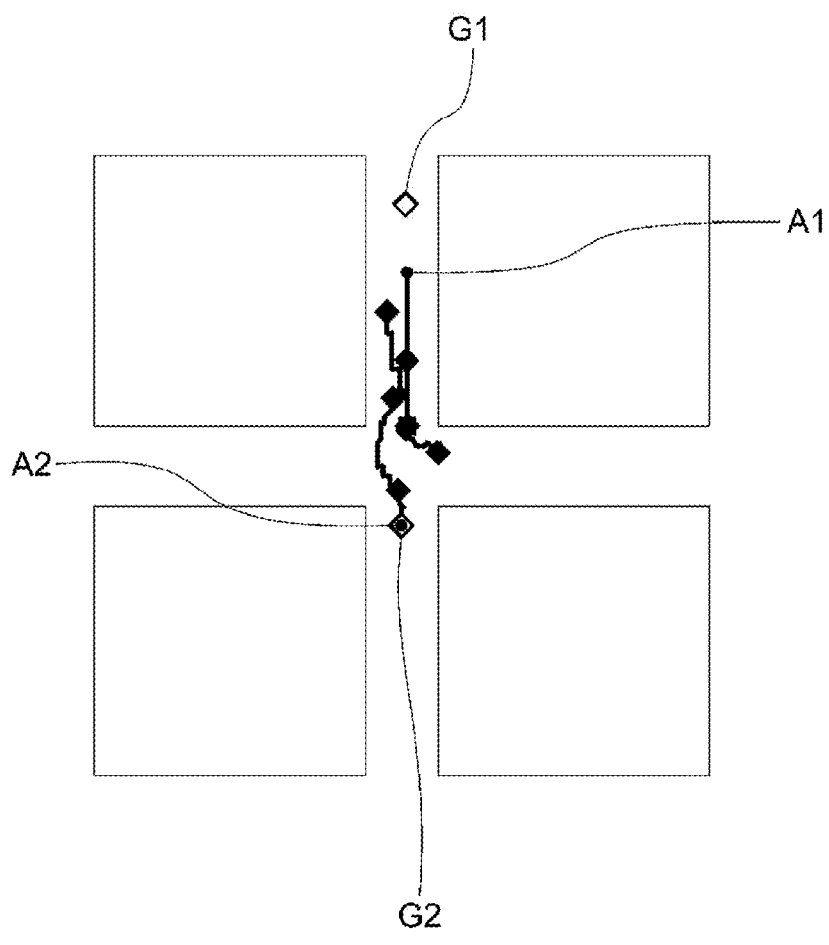
FIG. 13 is a diagram illustrating a specific example of control of movement of an agent by the agent control device.

FIG. 13 illustrates a state in which the agent A2 has reached the destination point G2 under the control of the agent control device 2. At this point in time, it is assumed that the agent A2 is already delayed from a scheduled time of arrival at the destination point G2.

Figure 14:
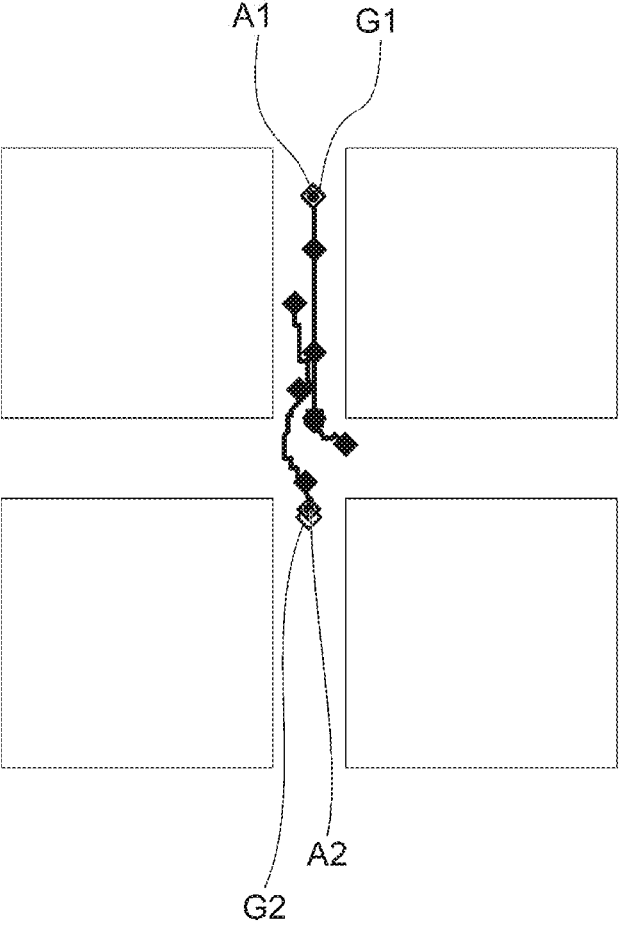
FIG. 14 is a diagram illustrating a specific example of control of movement of an agent by the agent control device.

FIG. 14 illustrates a state in which the agent A1 has also reached the destination point G1 under the control of the agent control device 2. At this point in time, it is assumed that the agent A1 is also already delayed from a scheduled time of arrival at the destination point G1.

By using the outputs of the cooperation model 10 and the movement model 20 in this manner, the agent control device 2 can control movement of agents such that the variation in costs required for movement of each agent is reduced or the variation and average in costs required are reduced.

Although the embodiments of the present disclosure have been described in detail with reference to the accompanying drawings, the technical scope of the present disclosure is not limited to such examples. It is obvious that a person ordinary skilled in the technical field of the present disclosure can conceive various changes or modifications within the scope of the technical idea described in the claims, and it is understood that these changes or modifications naturally belong to the technical scope of the present disclosure.

In addition, the effects described in the above embodiment are illustrative or exemplary, and are not limited to those described in the above embodiment. That is, the technology according to the present disclosure can exhibit other effects obvious to a person having ordinary knowledge in the technical field of the present disclosure from the description in the above embodiment together with the effects described in the above embodiment or instead of the effects described in the above embodiment.

The learning processing and the agent control processing executed by the CPU reading software (program) in each of the above-described embodiments may be executed by various processors other than the CPU. Examples of the processor in this case include a programmable logic device (PLD) in which a circuit configuration can be changed after manufacturing a field-programmable gate array (FPGA) or the like, a dedicated electric circuit that is a processor having a circuit configuration exclusively designed for executing specific processing such as an application specific integrated circuit (ASIC), and the like. Furthermore, the learning processing and the agent control processing may be executed by one of these various processors, or may be executed by any combination of two or more processors of the same type or different types (for example, a plurality of FPGAs, any combination of a CPU and an FPGA, and the like). More specifically, the hardware structure of these various processors is an electric circuit in which circuit elements such as semiconductor elements are combined.

Although an aspect in which the programs of the learning processing and the agent control processing are stored (installed) in advance in the ROM or the storage has been described in each of the above-described embodiments, the present disclosure is not limited thereto. The programs may be provided in a form recorded in a non-transitory recording medium such as a compact disk read only memory (CD-ROM), a digital versatile disk read only memory (DVD-ROM), and a universal serial bus (USB) memory. In addition, the programs may be downloaded from an external device via a network.

Application examples of the present disclosure will be described. The present disclosure is applicable to a rescue robot. For example, in a case in which a plurality of rescue robots rescue a plurality of disaster-stricken people in case of a large-scale disaster, it is possible to control the rescue robots to reach the disaster-stricken people with less delay and with less variation in delay for the plurality of disaster-stricken people, and thus the present disclosure effectively acts on a plurality of life-saving efforts that are time-sensitive. In addition, the present disclosure is applicable to an automated warehouse using a mobile robot, and in a process of taking out a product using a plurality of mobile robots, the efficiency of energy consumption of the mobile robots over time can be improved by reducing delay and variation. In addition, the present disclosure is applicable to a cooking robot and a chemical preparation robot (particularly, a dual arm robot), and exhibits an effect of reducing variations in preparation of ingredients performed while avoiding a collision of arms of the robot and timing thereof. Furthermore, the present disclosure is applicable to a machine that moves autonomously, such as a drone or an automated vehicle.

The present disclosure has been made in view of the above points, and an object of the present disclosure is to provide an agent control device, a learning device, an agent control method, a learning method, and a computer-readable recording medium for reducing variations in compensation required for movement of agents in an environment where a plurality of agents is present.

According to one aspect of the present disclosure, there is provided an agent control device including: a movement determination unit configured to input a first observation set, obtained by observing a state of a control target agent, and to input a second observation set, obtained by observing a state of at least one other agent in a periphery of the control target agent, to a first model and to determine information regarding movement of the control target agent in accordance with an output of the first model; a change amount determination unit configured to input the first observation set and the second observation set to a second model and to determine a change amount with respect to the information regarding movement of the control target agent in accordance with an output of the second model; and an operation control unit configured to operate the control target agent by applying the change amount determined by the change amount determination unit to the information regarding movement determined by the movement determination unit.

As a result, it is possible to control movement of agents such that variations in compensation required for movement of the agents in an environment in which a plurality of agents is present by applying the output of the second model to the output of the first model. Compensation may be, for example, a time required for movement from a start to a goal, a moving distance, an amount of energy consumed during movement, and the like. Further, the compensation is synonymous with cost.

The change amount determination unit may determine the change amount such that variations in compensation required for movement of the control target agent and the at least one other agent are reduced in accordance with the output of the second model. As a result, it is possible to control movement of the agents such that variation in compensation borne by each agent is reduced.

The change amount determination unit may determine the change amount such that variations in delay from scheduled moving times of the control target agent and the at least one other agent are reduced in accordance with the output of the second model. As a result, it is possible to control movement of the agents such that variation in delay from a scheduled moving time of each agent is reduced.

The change amount determination unit may determine the change amount such that variations in extension from scheduled moving distances of the control target agent and the at least one other agent are reduced in accordance with the output of the second model. As a result, it is possible to control movement of the agents such that variation in extension from a scheduled moving distance of each agent is reduced.

The change amount determination unit may determine the change amount such that variations in increases from scheduled use energies of the control target agent and the at least one other agent are reduced in accordance with the output of the second model. As a result, it is possible to control movement of the agents such that variation in extension from a scheduled moving distance of each agent is reduced.

The change amount determination unit may determine the change amount such that an average compensation required for movement of the control target agent and the at least one other agent is reduced in accordance with the output of the second model. As a result, it is possible to control movement of the agents such that the average of compensation required for movement of each agent is reduced.

The information regarding movement may be at least one of a movement direction, a movement amount, a time required for movement, a rotation direction, or a rotation amount of the control target agent. As a result, it is possible to control movement of the agent by changing at least one of the movement direction, the movement amount, the time required for movement, the rotation direction, and the rotation amount of the control target agent.

The operation control unit may whether or not the control target agent bears compensation required for movement in accordance with the output of the second model, in a case in which only the first observation set has been input to the second model. As a result, it is possible to determine whether or not to bear compensation required for movement of each agent.

Furthermore, according to another aspect of the present disclosure, there is provided a learning device including a learning unit configured to perform training of a second model, to which a first observation set obtained by observing a state of a control target agent and a second observation set obtained by observing a state of at least one other agent in a periphery of the control target agent are input, the first observation set and the second observation set being input to a first model, and the second model outputting, based on output of the first model, a change amount with respect to information regarding movement of the control target agent.

As a result, in an environment in which a plurality of agents is present, it is possible to learn the second model for applying the output to the output of the first model for controlling movement of the agents such that variation in compensation required for movement of the agents is reduced.

Furthermore, according to another aspect of the present disclosure, there is provided an agent control method, using a processor, performing processing, the processing including: inputting a first observation set obtained by observing a state of a control target agent and a second observation set obtained by observing a state of at least one other agent in a periphery of the control target agent to a first model and determining information regarding movement of the control target agent in accordance with an output of the first model; inputting the first observation set and the second observation set to a second model and determining a change amount with respect to the information regarding movement of the control target agent in accordance with an output of the second model; and operating the control target agent by applying the determined change amount to the determined information regarding movement.

As a result, it is possible to control movement of agents such that variations in compensation required for movement of the agents in an environment in which a plurality of agents is present by applying the output of the second model to the output of the first model.

Furthermore, according to another aspect of the present disclosure, there is provided a learning method, using a processor, performing processing, the processing including performing training of a second model, to which a first observation set obtained by observing a state of a control target agent and a second observation set obtained by observing a state of at least one other agent in a periphery of the control target agent are input, the first observation set and the second observation set being input to a first model, and the second model outputting, based on output of the first model, a change amount with respect to information regarding movement of the control target agent.

As a result, in an environment in which a plurality of agents is present, it is possible to learn the second model for applying the output to the output of the first model for controlling movement of the agents such that variation in compensation required for movement of the agents is reduced.

Furthermore, according to another aspect of the present disclosure, there is provided an agent control program that is executed by a computer to perform processing of: inputting a first observation set obtained by observing a state of a control target agent and a second observation set obtained by observing a state of at least one other agent in a periphery of the control target agent to a first model and determining information regarding movement of the control target agent in accordance with an output of the first model; inputting the first observation set and the second observation set to a second model and determining a change amount with respect to the information regarding movement of the control target agent in accordance with an output of the second model; and operating the control target agent by applying the determined change amount to the determined information regarding movement.

As a result, it is possible to control movement of agents such that variations in compensation required for movement of the agents in an environment in which a plurality of agents is present by applying the output of the second model to the output of the first model.

Furthermore, according to another aspect of the present disclosure, there is provided a learning program that is executed by a computer to perform processing of performing training of a second model, to which a first observation set obtained by observing a state of a control target agent and a second observation set obtained by observing a state of at least one other agent in a periphery of the control target agent are input, the first observation set and the second observation set being input to a first model, and the second model outputting, based on output of the first model, a change amount with respect to information regarding movement of the control target agent.

As a result, in an environment in which a plurality of agents is present, it is possible to learn the second model for applying the output to the output of the first model for controlling movement of the agents such that variation in compensation required for movement of the agents is reduced.

According to the present disclosure, it is possible to provide an agent control device, a learning device, an agent control method, a learning method, an agent control program, and a learning program for reducing variation in compensation required for movement of an agent in an environment in which a plurality of agents is present.

What is claimed is:

1. An agent control device, comprising:
a non-transitory computer-readable memory storing instructions; and
one or more processors coupled to the non-transitory computer-readable memory and configured, by executing the instructions, to:
input, by a movement determination unit, a first observation set having a plurality of pieces of data each corresponding to a state of a control target agent and a second observation set having a plurality of pieces of data each corresponding to a state of at least one other agent to a first model, the first model outputting a target movement of the control target agent,
wherein the at least one other agent is located within a distance from the control target agent that is detectable by a sensor of the control target agent, and
the target movement includes one or more parameters of a direction of a movement of the control target agent, an amount of the movement, a time required for the movement, a rotation direction of the movement, or a rotation amount of the movement;
input, by a change amount determination unit, the first observation set and the second observation set to a second model, the second model outputting a change amount with respect to the target movement,
wherein the change amount determination unit determines the change amount having a value in a range from 0 to 1, the change amount being based on a compensation metric across the control target agent and the at least one other agent; and
scale, by an operation control unit, at least one parameter included in the target movement using the change amount to reduce variations in movement between the control target agent and the at least one other agent.

2. The agent control device according to claim 1, wherein the change amount determination unit determines the change amount such that variations in delay from scheduled moving times of the control target agent and the at least one other agent are reduced in accordance with the output of the second model.

3. The agent control device according to claim 1, wherein the change amount determination unit determines the change amount such that variations in extension from scheduled moving distances of the control target agent and the at least one other agent are reduced in accordance with the output of the second model.

4. The agent control device according to claim 1, wherein the change amount determination unit determines the change amount such that variations in energy usage increases relative to scheduled energy usage of the control target agent and the at least one other agent are reduced in accordance with the output of the second model.

5. The agent control device according to claim 1, wherein the change amount determination unit determines the change amount such that an average compensation required for the movement of the control target agent and the at least one other agent is reduced in accordance with the output of the second model.

6. The agent control device according to claim 1, wherein the operation control unit determines whether or not the control target agent bears the compensation required for the movement in accordance with the output of the second model, in a case in which only the first observation set has been input to the second model.

7. A learning device, comprising a learning unit configured to perform training of a second model, to which a first observation set having a plurality of pieces of data corresponding to a state of a control target agent and a second observation set having a plurality of pieces of data corresponding to a state of at least one other agent are input, wherein the first observation set and the second observation set are input to a first model, and the second model outputs, based on output of the first model, a change amount with respect to a movement of the control target agent, the change amount being determined to have a value in a range from 0 to 1, based on a compensation metric across the control target agent and the at least one other agent, and the at least one other agent is located within a distance from the control target agent that is detectable by a sensor of the control target agent.

8. A non-transitory recording medium storing a program that is executable by a computer to perform processing, the processing comprising:

inputting a first observation set having a plurality of pieces of data each corresponding to a state of a control target agent and a second observation having a plurality of pieces of data each corresponding to a state of at least one other agent to a first model and obtain an output of the first model as a target movement of the control target agent, wherein the at least one other agent is located within a distance from the control target agent that is detectable by a sensor of the control target agent, and the target movement includes one or more parameters of a direction of a movement of the control target agent, an amount of the movement, a time required for the movement, a rotation direction of the movement, or a rotation amount of the movement inputting the first observation set and the second observation set to a second model and obtaining an output of the second model as a change amount with respect to the target movement, the change amount being determined to have a value in a range from 0 to 1, based on a compensation metric across the control target agent and the at least one other agent; and scaling at least one parameter included in the target movement using the change amount to reduce variations in movement between the control target agent and the at least one other agent.

9. The non-transitory recording medium according to claim 8, the processing further comprising: determining the change amount such that variations in delay from scheduled moving times of the control target agent and the at least one other agent are reduced in accordance with the output of the second model.

10. The non-transitory recording medium according to claim 8, the processing further comprising: determining the change amount such that variations in extension from scheduled moving distances of the control target agent and the at least one other agent are reduced in accordance with the output of the second model.

11. The non-transitory recording medium according to claim 8, the processing further comprising: determining the change amount such that variations in increases from scheduled use energies of the control target agent and the at least one other agent are reduced in accordance with the output of the second model.

12. The non-transitory recording medium according to claim 8, the processing further comprising: determining the change amount such that an average compensation required for movement of the control target agent and the at least one other agent is reduced in accordance with the output of the second model.

13. The non-transitory recording medium according to claim 8, the processing further comprising: determining whether or not the control target agent bears the compensation required for the movement in accordance with the output of the second model, in a case in which only the first observation set has been input to the second model.

14. The agent control device according to claim 1, wherein the second model outputs the change amount that reduces a difference in delay from scheduled moving times between the control target agent and the at least one other agent.

15. The agent control device according to claim 1, wherein the second model outputs the change amount that reduces a difference in extension from scheduled moving distances between the control target agent and the at least one other agent.

16. The agent control device according to claim 1, wherein the second model outputs the change amount that reduces a difference in energy usage relative to scheduled energy usage between the control target agent and the at least one other agent.

17. The agent control device according to claim 1, wherein the second model outputs the change amount that reduces a difference in compensation required between the movement of the control target agent and the movement of the at least one other agent.

\* \* \* \* \*